US009423172B2

(12) United States Patent
Wong et al.

(10) Patent No.: US 9,423,172 B2
(45) Date of Patent: Aug. 23, 2016

(54) ENERGY-SAVING OPTIMIZED CONTROL SYSTEM AND METHOD FOR REFRIGERATION PLANT ROOM

(75) Inventors: Hoyuen Wong, Shanghai (CN); Gang Wu, Shanghai (CN)

(73) Assignee: WELDTECH TECHNOLOGY (SHANGHAI) CO., LTD., Shanghai (CN)

(*) Notice: Subject to any disclaimer, the term of this patent is extended or adjusted under 35 U.S.C. 154(b) by 439 days.

(21) Appl. No.: 13/823,535

(22) PCT Filed: Oct. 13, 2010

(86) PCT No.: PCT/CN2010/001607
§ 371 (c)(1),
(2), (4) Date: Mar. 14, 2013

(87) PCT Pub. No.: WO2012/048443
PCT Pub. Date: Apr. 19, 2012

(65) Prior Publication Data
US 2013/0167560 A1    Jul. 4, 2013

(51) Int. Cl.
*F25D 29/00* (2006.01)
*G05B 15/02* (2006.01)

(52) U.S. Cl.
CPC ............... *F25D 29/00* (2013.01); *G05B 15/02* (2013.01); *G05B 2219/2638* (2013.01)

(58) Field of Classification Search
CPC .................. G05B 2219/2638; F25D 29/00
See application file for complete search history.

(56) References Cited

U.S. PATENT DOCUMENTS

| | | | |
|---|---|---|---|
| 5,651,264 A * | 7/1997 | Lo | F24F 3/065 |
| | | | 165/218 |
| 2008/0140259 A1 | 6/2008 | Bash et al. | |

FOREIGN PATENT DOCUMENTS

| | | |
|---|---|---|
| CN | 2578712 Y | 10/2003 |
| CN | 2898692 Y | 5/2007 |
| CN | 101251291 A | 8/2008 |
| CN | 201318766 Y | 9/2009 |
| CN | 201335489 Y * | 10/2009 |
| CN | 201335489 Y | 10/2009 |

OTHER PUBLICATIONS

International Search Report issued in PCT/CN2010/001607, dated Jul. 21, 2011.

* cited by examiner

*Primary Examiner* — Emmanuel Duke
(74) *Attorney, Agent, or Firm* — Birch, Stewart, Kolasch & Birch, LLP

(57) ABSTRACT

An energy-saving optimized control system for a chiller plant room comprises an industry control computer, a flow sensor, a temperature sensor, an outdoor temperature and humidity sensor, a three-phase active power transmitter, a water pump variable speed driver and a cooling tower fan variable speed driver, which are respectively connected with a programmable controller, wherein the programmable controller communicates with the industrial control computer through an industrial Ethernet; and an RS485 communication interface module is connected with chillers and communicates with the industrial control computer through a ModBus protocol. An energy-saving optimized control method for a chiller plant room is also provided. By establishing a mathematical model of the relationship between the energy consumption and operation parameters of each equipment in the refrigeration plant room and combining the real-time cooling loads and weather parameters, the operating state of each equipment is adjusted so as to reach the lowest operating energy consumption of the whole chiller plant room under the premise of meeting the cooling loads.

5 Claims, 2 Drawing Sheets

ENERGY-SAVING OPTIMIZED CONTROL SYSTEM AND METHOD FOR REFRIGERATION PLANT ROOM

TECHNICAL FIELD

The present invention relates to an energy-saving system and a method thereof, especially to a system for a chiller plant room.

TECHNICAL BACKGROUND

For the energy consumption of a whole building, the energy consumption of an air conditioning system takes a great proportion, which is about 40~50% generally. In addition, for the energy consumption of the air conditioning system, chiller plant room (which comprises chillers, chilled water pumps, condenser water pumps and cooling towers) will take about 60%~70%. Regarding to an office building using an electric cooling, the power consumption for all year of an air conditioning cooling source (chiller plant room), i.e. chillers, chilled and condenser water pumps and cooling towers, will take about 30~35% of the power consumption of the whole building for all year.

The cooling operational process of an air conditioning system comprises the following. The chillers produce chilled water with predetermined temperature. Chilled water is transported to air terminals through chilled water pumps, to conduct a thermal exchange with indoor air, absorb the heat indoor and remove the redundant moisture in the indoor air, to meet the requirements of the indoor environment. The temperature of the chilled water rises after absorbing the heat indoor, and then the chilled water is cooled again by chillers for recirculation. The heat generated by chillers during the operation, which is mainly the heat absorbed from the indoor air by chilled water, and also including the heat generated from the inherent energy loss due to some factors such as friction during the operation of the chillers, is absorbed by the cycled condenser water. The condenser water is transported to cooling towers through the condenser water pumps so as to perform the heat and humidity exchange with outdoor air by dissipating heat and moisture into the atmosphere finally.

Therefore, it is very important how to maximally save the energy consumption of a chiller plant room for reducing the energy consumption of the whole building. In the prior arts, chillers may operate with lower chilled water supply temperature and lower chilled water flow rate, which may lead to higher energy consumption of the chillers and lower energy consumption of the chilled water pumps. Alternatively, lower return chilled water temperature and higher chilled water flow rate are adopted. Likewise, to the same cooling output, chillers can be operated under a lower condensing pressure, which leads to lower energy consumption of the chillers; however, a higher condenser water flow rate is required for the lower condensing pressure, leading to a higher energy consumption of the condenser water pump. Or otherwise, adopt an operation mode of higher energy consumption of the chillers and lower energy consumption of the condenser water pumps. Therefore, an optimized energy-saving method is needed.

In the prior arts, some methods may be feasible in a stable laboratory condition, however, in the actual operational process, all the apparatuses in the chiller plant room are in the continuously operating state, and the cooling loads and the weather parameters will vary at any moment, which may cause the actual parameter values collected not having regularity, so the energy consumption model can not be optimized and even a contrary effect might be caused through adjusting the energy consumption model with the above methods.

Therefore, in the actual operation, it is impractical to find out the best operation condition point of highest efficiency of the whole chiller plant room with the above methods. In addition, none have the prior arts established the heat exchange model of the cooling tower, which will certainly reduce the effect of its energy consumption control.

SUMMARY

To overcome the shortage in the prior arts, the present invention provides an energy-saving optimized control system for a chiller plant room and a method thereof, which can greatly improve the energy efficiency of the apparatus in the chiller plant room of the air conditioning system, so as to save the energy consumption of the chiller plant room to the maximum.

According to the present invention, an energy-saving optimized control system for a chiller plant room is provided, which comprises an industrial control computer, a programmable controller, an RS485 communication interface module, a flow sensor, a temperature sensor, an outdoor temperature and humidity sensor, a three-phase active power transmitter, a differential pressure sensor, a water pump variable speed driver, a cooling tower fan variable speed driver, a motorized valve and on/off actuator, and chillers, wherein, the flow sensor, the temperature sensor, the outdoor temperature and humidity sensor, the three-phase active power transmitter, the water pump variable speed driver and the cooling tower fan variable speed driver connect with the programmable controller respectively, and the programmable controller communicates with the industrial control computer via the industrial Ethernet, and the RS485 communication interface module connected with the chillers communicates with the industrial control computer via the ModBus protocol. The temperature sensor is used to monitor the chilled water supply/return temperatures and condenser water supply/return temperatures, and the outdoor temperature and humidity sensor is used to monitor the dry bulb temperature and the relative humidity of outdoor air, the flow sensor is used to monitor the water flow rate during the operation of the water pump, the three-phase active power transmitter is used to monitor the operation energy consumption of the chillers, the water pump and the cooling tower, and the differential pressure sensor is used to monitor the pressure difference at the air terminals, the programmable controller and the RS485 communication interface module are used to acquire the data obtained by the sensors in real time, the industrial computer is used to save the data and send out operational control instructions.

The energy-saving optimized control system for a chiller plant room according to present invention also has the following additional technical features:

The outdoor temperature and humidity sensor is installed near an air intake opening of the outdoor cooling tower; the chilled water supply/return main pipes are mounted with temperature sensors respectively; the condenser water supply/return main pipes are provided with temperature sensors respectively; the chilled water supply or return main pipes are mounted with flow sensors; the condenser water supply or return main pipe is mounted with the flow sensor; the differential pressure sensor is mounted between the chilled water supply main pipe and the chilled water return main pipe; the evaporator inlet and the condenser inlet of each chillers, and the water supply pipe and the water return pipe of each cooling tower are mounted with the motorized valve and on/off actuators respectively; and each chillers, each chilled water pump, each condenser water pump and each cooling tower are mounted with the three-phase active power transmitter respectively.

The data acquired by the programmable controller comprises the data obtained by the flow sensors, the temperature sensors, the outdoor temperature and humidity sensors, the three-phase active power transmitters and the differential pressure sensors, which were sent to the industrial control computer by the programmable controller, and the industrial control computer saves the data one by one with a predetermined time interval, wherein, the supply/return water temperatures of the condenser water is detected by the temperature sensor, which are transferred to the industrial computer by the programmable controller. In addition, the chillers also include an own set of sensors for condenser water entering/leaving temperatures, data of which are directly transferred to the industrial computer through the RS485 interface, and the chilled water supply/return temperatures are the same as that of the condenser water.

The RS485 communication interface module performs the data acquisition of the parameters from the chillers including at least the chilled water entering/leaving temperatures, the condenser water entering/leaving temperatures, the condensing temperature, the condensing pressure, the evaporating temperature and the evaporating pressure, communicates with the industrial control computer using a ModBus protocol and transfers the data information of the chillers, and saves them in the order of time, that is, saves the data by group with a predetermined time interval.

The industrial control computer processes the data information acquired by the programmable controller and RS485 communication interface module, and then sets an objective function in which the energy consumption of the whole chiller plant room is the lowest, and determines the optimized energy-saving operation condition of each apparatus in the chiller plant room at the next moment, and transfers the results to the programmable controller and RS485 communication interface module.

The programmable controller and the RS485 communication interface module transfer the optimized operation condition to the adjusters of the corresponding apparatus, so as to make the apparatus operate under the optimized operation condition.

The present invention also provides an energy-saving optimized controlling method for the chiller plant room, which comprises the following steps:

First step, establishing the mathematical models: according to a series of operational parameters from actual measurement of each apparatus in the chiller plant room, combining the default factory operational parameters of each apparatus, establish the mathematical model for each apparatus and the energy consumption of each apparatus, and establish a calibration program at the same time.

Second step, acquiring the real time data: obtaining at least the parameters of the chilled water entering/leaving temperatures, the condenser water entering/leaving temperatures, the condensing temperature, the condensing pressure, the evaporating temperature, the evaporating pressure of the chillers, and obtaining as well as the outdoor dry bulb temperature, the outdoor relative humidity, the chilled water supply/return temperature, the condenser water supply/return temperature, the chilled water flow rate, the condenser water flow rate, the power of the chillers, the power of the chilled water pump, the power of the condenser water pump and the power of the cooling tower, and save the data one by one with a predetermined time interval.

Third step, calibrating the mathematical models: according to the real time operation data measured in the second step, calling the calibration program to perform the real time online calibration to the mathematical models established in the first step; the energy consumption of each apparatus in the system is calculated by the mathematical models according to its operational parameters, and the calculated results are used in energy consumption forecasting and optimized operation, and since there may be deviations between the mathematical model and the actual apparatus, in order to improve the accuracy of the forecasting, during the operation process the results and even the mathematical models themselves shall be calibrated online in real time according to the obtained data.

Fourth step, performing an optimization calculation: performing an optimization calculation with the objective that the sum of the energy consumption models of each apparatus shall be the minimum, obtaining the best operation condition for the chiller plant room, and perform a surge forecast for the chillers at the same time, so that when the chillers are about to face a potential surge, protection against surge is provided for the chillers in advance by adjusting the operation condition point of the chillers and the operation condition point restores to the former status automatically after the potential surge is eliminated.

Fifth step, performing a feedback: transfer the best operation conditions obtained in the fourth step to each apparatus so that each apparatus will operate under the best operation condition and that the whole chiller plant room will operate with the minimum energy consumption.

Sixth step, repeating the third, the fourth and the fifth step with a predetermined time interval.

The energy-saving optimized controlled method for a chiller plant room according to the present invention also includes the following additional technical features:

As the main apparatus in the chiller plant room are the chillers, the chilled water pump, the condenser water pumps and the cooling towers, the energy consumption models shall be established for these four kinds of apparatus, the mathematical models mentioned in the first step include the energy consumption model for chillers, the energy consumption model for chilled water pumps, the energy consumption model for condenser water pump and the energy consumption model for cooling towers. The above mathematical models are as follows:

$$P_{chiller} = \sum_{i=1}^{n_{Chiller}} \frac{Q_{nom,i}}{COP_{nom,i}} \cdot PLR_{adj,i} \cdot TEMP_{adj,i}$$

$$PLR_{adj} = a_0 + a_1\left(\frac{Q_{chiller}}{Q_{nom}}\right) + a_2\left(\frac{Q_{chiller}}{Q_{nom}}\right)^2$$

$$TEMP_{adj} = \\ b_0 + b_1 T_{CHWS} + b_2 T_{CHWS}^2 + b_3 T_{CWS} + b_4 T_{CWS}^2 + b_5 T_{CHWS} \cdot T_{CWS}$$

$$P_{pump} = \frac{kQ_w^3 + H_{st \cdot w}Q_w}{\eta_p \eta_c \eta_m} + P_{VFD}$$

$$P_{CHWpump} = \sum_{j=0}^{n_{CHWpump}} \sum_{J=0}^{3} c_{J,j} Q_{w\_CHWpump}^J$$

$$P_{CWpump} = \sum_{k=0}^{n_{CWpump}} \sum_{K=0}^{3} d_{K,k} Q_{w\_CWpump}^K$$

$$P_{CTfan} = \sum_{l=0}^{n_{CTfan}} \sum_{L=0}^{3} e_{L,l} Q_{air\_CTfan}^L$$

-continued $$Q_{rej} = \frac{x_1 m_w^{x_3}}{1 + x_2\left(\frac{m_w}{m_a}\right)^{x_3}}(T_{CWS} - T_{wb,i})$$

In the fourth step, the algorithm for the optimization calculating is:

$$P_{chiller\_plant} = \text{Min}(P_{chiller} + P_{CHWpump} + P_{CWpump} + P_{CTfan})$$

In which:
$P_{chiller}$ the energy consumption of chillers, kW;
$n_{chiller}$ the number of chillers in operation;
$Q_{nom}$: the nominal capacity of chillers, kW;
$COP_{nom}$: the nominal COP of chillers;
$PLR_{adj}$: the part load regulating factor of chillers;
$TEMP_{adj}$: the temperature regulating factor of chillers;
$a_0$, $a_1$, $a_2$: the part load regulating factor coefficient of chillers;
$Q_{chiller}$: the actual cold quantity of chillers, kW;
$b_0$, $b_1$, $b_2$ $b_3$, $b_4$, $b_5$: the temperature regulating factor coefficient of chillers;
$T_{CHWS}$: chilled water entering temperature, ° C.;
$P_{pump}$: the energy consumption of water pump, kW;
$H_{st,w}$: static pressure (only for open-type systems), mH$_2$O;
k: parameter relating to a pipe characteristic curve;
$Q_w$: water flow rate, kg/s;
$\eta_p$: water pump efficiency;
$\eta_c$: transmission efficiency;
$\eta_m$: electrical efficiency;
$P_{VFD}$: the energy consumption of VSD drivers, kW;
$P_{CHWpump}$: the energy consumption of chilled water pump, kW;
$n_{CHWpump}$: the number of chilled water pump in operation;
$c_{J,j}$: coefficient of chilled water pump;
$Q_{w\_CHWpump}$: the flow rate of chilled water pump, kg/s;
$P_{CWpump}$: the energy consumption of condenser water pump, kW;
$d_{K,k}$: coefficient of condenser water pump;
$Q_{w\_CWpump}$: flow rate of condenser water pump, kg/s;
$n_{CWpump}$: the number of condenser water pump in operation;
$P_{CTfan}$: the energy consumption of cooling tower, kW;
$n_{CTfan}$: the number of cooling tower in operation;
$e_{L,i}$: coefficient of cooling tower;
$Q_{air\_CTfan}$: air rate of cooling tower, kg/s; wherein, regarding to a single-speed cooling tower and a two-speed cooling tower, the air rate can be obtained from the manufacture brochure or tower template; regarding to a VSD cooling tower, the change of the air rate is calculated by the change in the frequency of the cooling tower fan;
$Q_{rej}$: heat dissipating rate of cooling tower, kW;
$m_w$: condenser water flow rate, kg/s;
$m_a$: air rate of cooling tower, kg/s; wherein, regarding to a single-speed cooling tower and a two-speed cooling tower, the air rate can be obtained from the manufacture brochure or tower template; regarding to a VSD cooling tower, the change of the air rate is calculated by the change in the frequency of the cooling tower fan;
$T_{CWS}$: condenser water entering temperature, ° C.;
$T_{wb,i}$: air wet bulb temperature, ° C.;
In the second step, the minimal time interval for acquiring the real time data is set to 2 minutes, so as to acquire more data and find the faults in the system timely.

In the sixth step, the minimal value of the time interval for repeating is 10 minutes. In a general chilled water system, the chilled water supplied from the chillers flows through the water pump and returns to the chillers after a terminal heat exchanging, which needs some time, and 10 minutes is preferable to reflect this process; if the interval is too short, the whole process can not be reflected and an accurate load condition can not be obtained; if the interval is too long, the system may operate under a non-optimized operating condition for a long time, which may cause energy waste.

The present invention takes into full account the impact of apparatus on each other in the chiller plant room during the operation process, in which the chiller plant room is considered to be integral, and fully considering the best operation condition for each apparatus to find the best combination of the apparatus in the chiller plant room, so as to achieve the objective that the chiller plant room is operated at an improved status, thereby the energy consumption of the whole system is the lowest, and the objective of energy-saving is achieved.

DETAILED DESCRIPTION OF THE EMBODIMENTS

Figure 1:
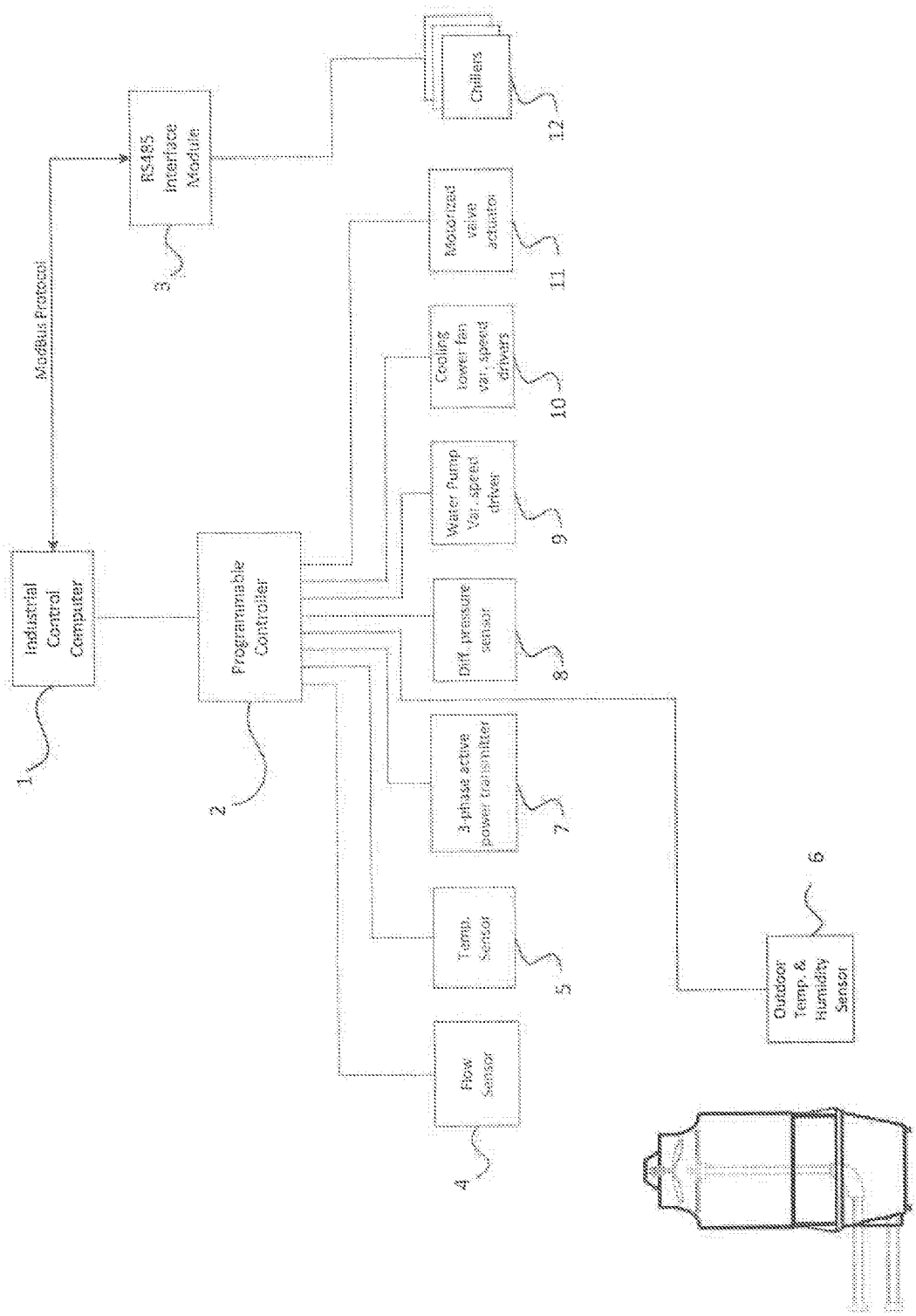
FIG. 1 is a structural diagrammatic drawing of the embodiment of the device according to the present invention.
Figure 2:
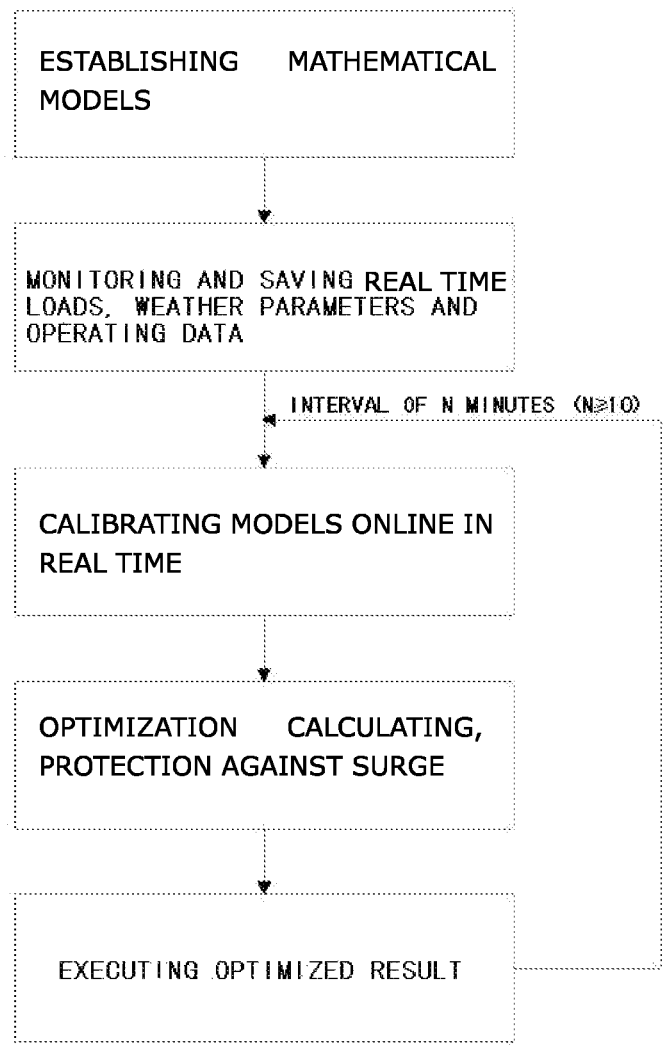
FIG. 2 is a flow chart of the embodiment of the method according to the present invention.

As shown in the FIG. 1 and FIG. 2, the embodiment of the device according to present invention comprises: a industrial control computer 1, a programmable controller 2, an RS485 communication interface module 3, a flow sensor 4, a temperature sensor 5, an outdoor temperature and humidity sensor 6, a three-phase active power transmitter 7, a differential pressure sensor 8, a water pump variable speed driver 9, a cooling tower fan variable speed driver 10, a motorized valve and on/off actuator 11, and chillers 12.

According to the present invention, there are provided with a plurality of flow sensors 4, a plurality of temperature sensors 5, one outdoor temperature and humidity sensor 6, a plurality of three-phase active power transmitters 7, a differential pressure sensor 8, a plurality of water pump variable speed drivers 9 and a plurality of cooling tower fan variable speed drivers 10, which are connected with the programmable controller 2 respectively. The programmable controller 2 communicates with the industrial control computer 1 via industrial Ethernet, and the RS485 communication interface module 3 connects with the unit and communicates with the industrial control computer 1 through ModBus protocol. The outdoor temperature and humidity sensor 6 is provided near an air intake opening of the outdoor cooling tower, and the chilled water supply/return main pipes are provided with one temperature sensor 5 respectively, the condenser water supply/return main pipes are provided with one temperature sensor 5 respectively, the chilled water supply or return main pipe is mounted with one flow sensor 4, and the condenser water supply or return main pipe is mounted with one flow sensor 4. The differential pressure sensor 8 is mounted between the chilled water supply main pipe and the chilled water return main pipe. The evaporator inlet and the condenser inlet of each chillers, and the water supply pipe and the water return pipe of each cooling tower are mounted with one motorized valve and on/off actuator 11 respectively, and each chillers, each chilled water pump, each condenser water pump and each cooling tower are mounted with one three-phase active power transmitter 7 respectively.

The temperature sensors 5 are used to monitor the chilled water supply/return temperatures and condenser water supply/return temperatures; the outdoor temperature and humidity sensor 6 is used to monitor the dry bulb temperature and relative humidity of the outdoor air; the flow sensors 4 are used to monitor the water flow rates during the operation of the water pump; the three-phase active power transmitters 7 are used to monitor the operation energy consumptions of the chillers, the water pump and the cooling tower; and the differential pressure sensor 8 is used to monitor the pressure difference at the air terminals; the programmable controller 2 performs the data acquisition for the flow sensors 4, the temperature sensors 5, the outdoor temperature and humidity sensor 6, the three-phase active power transmitters 7 and the differential pressure sensor 8, sends the data to the industrial control computer 1, which saves the data one by one with a predetermined time interval; the RS485 communication interface module 3 performs the data acquisition for the parameters including the chilled water entering/leaving temperatures, the condenser water entering/leaving temperatures, the condensing temperature, the condensing pressure, the evaporating temperature and the evaporating pressure of the chillers, communicates with the industrial control computer 1 using ModBus protocol and transfers these data information of the chillers, and the industrial control computer 1 saves them in the order of time; the industrial control computer 1 processes the data information acquired by the programmable controller 2 and the RS485 communication interface module 3, and then sets an objective function that the energy consumption of whole chiller plant room is the lowest, and determines the optimized energy-saving operation condition of each apparatus in the chiller plant room at the next moment, and transfers the determined result to the programmable controller 2 and the RS485 communication interface module 3. The programmable controller 2 and the RS485 communication interface module 3 transfers the optimized operation condition to the adjusters of the corresponding apparatus, so that under the premise of meeting the cooling loads, all the apparatus will operate safely in an energy-saving status that total energy consumption of the whole refrigeration plant room is the minimum.

As shown in the FIG. 2, the process for implementing the method of the present invention is described in detail as follows:

Firstly, mathematical models for the operational parameters and the energy consumption of each apparatus are established according to the series of operational parameters actually measured of each apparatus in the chiller plant room in combination of the default factory operational parameters of each apparatus. Meanwhile, a calibration program is also established. In the present embodiment, the established mathematical models include the energy consumption model for chillers, the energy consumption model for chilled water pump, the energy consumption model for condenser water pump and the energy consumption model for cooling tower;

Secondly, the industrial control computer acquires the parameters of the chilled water entering/leaving temperatures, the condenser water entering/leaving temperatures, the condensing temperature, the condensing pressure, the evaporating temperature, the evaporating pressure or the like of the chillers through the RS485 communication interface module, obtains through the programmable controller the outdoor dry bulb temperature, the relative humidity, the chilled water supply temperature, the chilled water return temperature, the condenser water supply temperature, the condenser water return temperature, the chilled water flow rate, the condenser water flow rate, the power of the chillers, the power of the chilled water pump, the power of the condenser water pump and the power of the cooling tower transferred from the sensors, and saves the data one by one with a predetermined time interval; the time interval could be set to 2 minutes;

Then, after acquiring the real time operation data of each apparatus through the RS485 communication interface module and the programmable controller, the industrial control computer calls the model correction program to perform the real time correction online to the energy consumption models of each apparatus in the refrigeration plant room;

Then, according to the real time cooling load and the meteorological parameters monitored, and according to the calibrated energy consumption models for the chillers, the chilled water pump, the condenser water pump and the cooling tower, in order to achieve the goal of reaching the maximum of the efficiency of the whole chiller plant room, that is, to achieve the goal of reaching the minimum of each energy consumption model for chillers, the energy consumption model for chilled water pump, the energy consumption model for condenser water pump and the energy consumption model for cooling tower, the industrial control computer performs the optimization calculation to achieve the best operation condition of each apparatus in the chiller plant room, and performs a surge forecast for the chillers at the same time. The industrial control computer provides protection against surge for the chillers in advance by adjusting the operation condition point of the chillers when the chillers are about to face a potential surge and restores the operation condition point to its former level automatically after the potential surge is eliminated;

Finally, the industrial control computer transfers the best operation condition obtained by the optimization calculation to the chillers and the programmable controller through the RS485 communication interface module and the industrial Ethernet, and each apparatus will operate under the operation condition in the optimized result, so that the whole chiller plant room will operate with the minimal energy consumption;

In the present embodiment, the calculation model for the optimized energy-saving operation condition in the industrial control computer 1 is described as follows:

$$P_{chiller\_plant} = \text{Min}(P_{chiller} + P_{CHWpump} + P_{CWpump} + P_{CTfan}) \quad (1)$$

$$P_{chiller} = \sum_{i=1}^{n_{Chiller}} \frac{Q_{nom,i}}{COP_{nom,i}} \cdot PLR_{adj,i} \cdot TEMP_{adj,i} \quad (2)$$

$$PLR_{adj} = a_0 + a_1\left(\frac{Q_{chiller}}{Q_{nom}}\right) + a_2\left(\frac{Q_{chiller}}{Q_{nom}}\right)^2 \quad (3)$$

$$TEMP_{adj} = \\ b_0 + b_1 T_{CHWS} + b_2 T_{CHWS}^2 + b_3 T_{CWS} + b_4 T_{CWS}^2 + b_5 T_{CHWS} \cdot T_{CWS} \quad (4)$$

$$P_{pump} = \frac{kQ_w^3 + H_{st,w}Q_w}{\eta_p \eta_c \eta_m} + P_{VFD} \quad (5)$$

$$P_{CHWpump} = \sum_{j=0}^{n_{CHWpump}} \sum_{J=0}^{3} c_{J,j} Q_{w\_CHWpump}^J \quad (6)$$

$$P_{CWpump} = \sum_{k=0}^{n_{CWpump}} \sum_{K=0}^{3} d_{K,k} Q_{w\_CWpump}^K \quad (7)$$

-continued $$P_{CTfan} = \sum_{l=0}^{n_{CTfan}} \sum_{L=0}^{3} e_{L,l} Q_{air\_CTfan}^{L} \qquad (8)$$

$$Q_{rej} = \frac{x_1 m_w^{x_3}}{1 + x_2 \left(\frac{m_w}{m_a}\right)^{x_3}} (T_{CWS} - T_{wb,i}) \qquad (9)$$

In which:
- $P_{chiller}$: the energy consumption of chillers, kW;
- $n_{chiller}$: the number of chillers in operation;
- $Q_{nom}$: the nominal capacity of chillers, kW;
- $COP_{nom}$: the nominal COP of chillers;
- $PLR_{adj}$: the part load regulating factor of chillers;
- $TEMP_{adj}$: the temperature regulating factor of chillers;
- $a_0, a_1, a_2$: the part load regulating factor coefficient of chillers;
- $Q_{chiller}$: the actual cold quantity of chillers, kW;
- $b_0, b_1, b_2, b_3, b_4, b_5$: the temperature regulating factor coefficient of chillers;
- $T_{CHWS}$: chilled water entering temperature, ° C.;
- $P_{pump}$: the energy consumption of water pump, kW;
- $H_{st,w}$: static pressure (only for open-type systems), mH$_2$O;
- k: parameter relating to a pipe characteristic curve;
- $Q_w$: water flow rate, kg/s;
- $\eta_p$: water pump efficiency;
- $\eta_c$: transmission efficiency;
- $\eta_m$: electrical efficiency;
- $P_{VFD}$: the energy consumption of VSD drivers, kW;
- $P_{CHWpump}$: the energy consumption of chilled water pump, kW;
- $n_{CHWpump}$: the number of chilled water pump in operation;
- $c_{J,j}$: coefficient of chilled water pump;
- $Q_{w\_CHWpump}$: the flow rate of chilled water pump, kg/s;
- $P_{CWpump}$: the energy consumption of condenser water pump, kW;
- $d_{K,k}$: coefficient of condenser water pump;
- $Q_{w\_CWpump}$: flow rate of condenser water pump, kg/s;
- $n_{CWpump}$: the number of condenser water pump in operation;
- $P_{CTfan}$: the energy consumption of cooling tower, kW;
- $n_{CTfan}$: the number of cooling tower in operation;
- $e_{L,l}$: coefficient of cooling tower;
- $Q_{air\_CTfan}$: air rate of cooling tower, kg/s;
- $Q_{rej}$: heat dissipating rate of cooling tower, kW;
- $m_w$: condenser water flow rate, kg/s;
- $m_a$: air rate of cooling tower, kg/s;
- $T_{CWS}$: condenser water entering temperature, ° C.;
- $T_{wb,i}$: air wet bulb temperature, ° C.;

Formula (1) sets the maximum of the efficiency of the whole chiller plant room as the objective function; Formula (2) is the energy efficiency model for the chillers; Formula (3) is the part load regulating factor in the energy efficiency model for the chillers; Formula (4) is the temperature regulating factor in the energy efficiency model for the chillers, in which the parameters $a_0, a_1, a_2, b_0, b_1, b_2, b_3, b_4, b_5$ are obtained by regression fitting according to the operating characteristics of the chillers in combination with the data of the samples from the manufacturer; Formula (5), Formula (6), and Formula (7) are the energy efficiency models for the water pump, in which the coefficients $c_{J,j}, d_{K,k}$ are obtained by multiple nonlinear regression according to a series of operating flow rate and the corresponding energy consumption of the pump obtained by actual measurement, in combination with the corresponding samples from the manufacturer of the chillers; Formula (8) is the energy efficiency model for the cooling tower, in which the coefficient $e_{L,l}$ is obtained by multiple nonlinear regression according to a series of operating air flow rate and the corresponding energy consumption of the cooling tower fan obtained by actual measurement, in combination with the corresponding samples from the manufacturer of the cooling towers; Formula (9) is the relationship between the heat dissipating rate of the cooling tower and the air flow rate of the cooling tower, the water flow rate, the condenser water temperature, and the air wet bulb temperature, in which the coefficients $x_1, x_2, x_3$ are obtained by multiple nonlinear regression, from the corresponding relationship between the air flow rate of the cooling tower fan, the water flow rate, the condenser water temperature and the heat exchange quantity of the cooling tower, according to the conditions of a series of environmental air dry/wet bulb temperatures, in combination with the corresponding samples from the manufacturer of the cooling tower.

After the virtual system is established using the above models, the operating status with the best efficiency can then be found by global optimization algorithm. The input of the global optimization algorithm includes: the real time cooling loads and the weather parameters. At the same time, it should also be noted the settings of some limits. Firstly, each apparatus in the chiller plant room has its maximum operating capacity and operating number. Secondly, each one apparatus in the chiller plant room is connected in a specific manner with other apparatus and they will affect each other in the operational process. For example, the chiller, the water pump and the cooling tower must be operated simultaneously so as to achieve the cooling process. In addition, the mass and energy balance is also a condition which shall be considered in the global optimization algorithm; for example, in the operation process of the system, the quantity of the condenser water flowing through the condenser water pump, the cooling tower and the condenser shall be equal, and the heat dissipating capacity of the cooling tower shall substantially equal to the sum of the cooling loads and the power of the chillers.

During performance of the optimization calculation, the algorithm shall monitor the real time cooling loads and the weather parameters, which serve as the input conditions, with the relevant conditions for limits mentioned above as the restrictions, and set the maximum of the efficiency of whole chiller plant room as an objective function. Here, a high efficiency method is adopted, according to the established virtual system model, to find the best combination of the operating apparatus and the best combination of the apparatus settings. Upon the determination of the best combinations, they are applied to the actual chiller plant room so as to ensure the actual chiller plant room operates in a high efficient status.

The following is an example of a certain operation condition in the intermediate process:

For example: at a certain time point, the actual operation condition of a chiller plant room is: one set of chillers, one chilled water pump, one condenser water pump, one cooling tower are in operation. The nominal capacity of chillers $Q_{nom,1}$ is 7032 kW, and the nominal $COP_{nom,1}$ of chillers is 5.1. The actual cooling outputs of chillers $Q_{chiller}$ is 4922 kW, the supply chilled water temperature is 7° C., and the supply condenser water temperature is 29° C., with the part load regulating factors of chillers being $a_0$=0.13547, $a_1$=0.75320, $a_3$=0.10684 and the temperature regulating factor of chillers being $b_0$=0.68874, $b_1$=−0.0043184, $b_2$=0.0010723, $b_3$=0.0014989, $b_4$=0.0004789, $b_5$=−0.0010965. The chilled water pump operates with variable frequency drivers, and the flow rate of the chilled water is 235 kg/s. The condenser water pump operates with variable frequency drivers, and the flow rate of the condenser water is 279 kg/s. The coefficients of the chilled water pump includes $c_{0,1}$=38.001, $c_{1,1}$=0.17599, $c_{2,1}$=−0.00014970, $c_{3,1}$=2.6998*10$^{-7}$; the coefficients of the condenser water pump includes $d_{0,1}$=0.014346, $d_{1,1}$=−0.00010675, $d_{2,1}$=0.0, $d_{3,1}$=0.000001552. The cooling tower is a single-speed cooling tower, in which the cooling tower fan operates at the frequency of 50 Hz, and the rated power of the cooling tower fan is 42 kW. According to the established mathematical models, it can be achieved that:

$$PLR_{adj} = 0.13547 + 0.75320 \times \left(\frac{4922}{7032}\right) + 0.10684 \times \left(\frac{4922}{7032}\right)^2 = 0.715$$

$$TEMP_{adj} =$$
$$0.68874 - 0.0043184 \times 7 + 0.0010723 \times 7 \times 7 + 0.0014989 \times 29 +$$
$$0.0004789 \times 29 \times 29 - 0.0010965 \times 7 \times 29 = 0.935$$

$$P_{chiller} = \frac{7032}{5.1} \times 0.715 \times 0.935 = 921 \text{ kW}$$

$$P_{CHWpump} = 38.001 + 0.17599 \times 235 - 0.001497 \times 235 \times 235 +$$
$$2.6998 \times 10^{-7} \times 235 \times 235 \times 235 = 74.6 \text{ kW}$$

$$P_{CWpump} = 0.014346 - 0.00010675 \times 279 +$$
$$0.0000015552 \times 279 \times 279 \times 279 = 33.8 \text{ kW}$$

$$P_{CTfan} = 42 \text{ kW}$$

Under the above operation condition, the total energy consumption of the chiller plant room is:

$$P_{chiller\_plant} = 921 + 74.6 + 33.8 + 42$$
$$= 1071.4 \text{ kW}$$

After the total energy consumption of the chiller plant room under such operation condition is obtained, the optimization control algorithm will calculate by the same method the total energy consumption of the chiller plant room in which various apparatus operates in different operation conditions under the conditions of the real time cooling loads and the weather parameters, to determine the best operation condition, that is, in which the total energy consumption of the chiller plant room is the minimum in all the operation conditions, and then the best operation condition is achieved, so that the objective of energy saving is realized.

The above embodiments are only used to explain the present invention, which shall not be the limitations to the present invention. The skilled persons in the field can achieve a variety of alternative or improved technical solutions on the basis of the above disclosure without deviating the spirit and the protection scope of the present invention. The Claims of the present invention as attached are desired to include all the alternative or improved technical solutions in accordance with the essence and the scope of the present invention.

The invention claimed is:

1. An energy-saving optimized control system for a chiller plant room, comprising:
   an industrial control computer;
   a programmable controller that communicates with the industrial control computer via an industrial Ethernet;
   a plurality of devices, including at least one chiller, at least one chilled water pump, at least one condenser water pump, and at least one cooling tower;
   a plurality of sensors, each sensor respectively connected with the programmable controller;
   a plurality of drivers, each driver respectively connected with the programmable controller; and
   a plurality of chillers connected to an RS485 communication interface module that communicates with the industrial control computer via a ModBus protocol, wherein
      the programmable controller and the RS485 communication interface module are configured to acquire sensor data obtained from the plurality of sensors in real-time, and
      the industrial computer is configured to
         establish, for each of the plurality of devices, a mathematical energy consumption model that determines the energy consumption of the corresponding devices based on a series of operational parameters from a combination default factory operational parameters for each of the plurality of devices and the obtained sensor data,
         save, at predefined intervals, the sensor data received from the programmable controller and RS485 communication interface module,
         periodically re-calibrate the established mathematical energy consumption models based on the received sensor data;
         calculate a current energy consumption of each of the plurality of devices based on the received sensor data and the re-calibrated mathematical energy consumption models;
         determine preferred operating parameters for each of the plurality of devices by determining operational parameters for each of the plurality of devices that minimize the sum of the re-calibrated energy consumption models of each of the plurality of devices; and
         send operational control instructions to the plurality of drivers to operate the plurality of devices at the preferred operating conditions.

2. The energy-saving optimized control system for the chiller plant room according to claim 1, wherein the plurality of sensors include:
   an outdoor temperature and humidity sensor provided near an air intake opening of an outdoor cooling tower;
   a plurality of temperature sensors respectively provided in chilled water supply/return main pipes and condenser water supply/return main pipes
   a flow sensor mounted on the chilled water supply or return main pipes;
   a flow sensor mounted on the condenser water supply or return main pipes;
   a differential pressure sensor mounted between the chilled water supply main pipe and the chilled water return main pipe; and
   wherein the plurality of drivers includes a motorized valve and on/off actuators respectively mounted on an evaporator inlet and an condenser inlet of each of the plurality of chillers, and the water supply pipe and the water return pipe of each cooling tower; and
   a three-phase active power transmitter respectively mounted with each chillers, each chilled water pump, each condenser water pump and each cooling tower.

3. The energy-saving optimized control system for the chiller plant room according to claim 2, wherein,
   the data acquired by the programmable controller comprises data obtained by the flow sensor, the temperature sensor, the outdoor temperature and humidity sensor, the three-phase active power transmitter and the differential pressure sensor, and the industrial control computer saves the above data one by one with a predetermined time interval.

4. The energy-saving optimized control system for the chiller plant room according to claim 2, wherein, the RS485 communication interface module performs data acquisition of the parameters from the chillers including at least chilled water entering/leaving temperatures, condenser water entering/leaving temperatures, condensing temperature, condensing pressure, evaporating temperature and evaporating pressure, communicates with the industrial control computer using the ModBus protocol and transfers the data information of the chillers, and saves them in the order of time.

5. The energy-saving optimized control system for the chiller plant room according to any one of claims 1 to 4, wherein, the industrial control computer processes the data acquired by the programmable controller and the RS485 communication interface module, and then sets the lowest energy consumption of the whole chiller plant room as an objective function, to determines the optimized energy-saving operation condition of each apparatus in the chiller plant room at the next moment, and transfers the results to the programmable controller and the RS485 communication interface module.

* * * * *